United States Patent [19]

Hohjoh

[11] Patent Number: 4,647,183

[45] Date of Patent: Mar. 3, 1987

[54] DOCUMENT-CONVEYING COPYING MACHINE

[75] Inventor: Susumu Hohjoh, Sakurai, Japan

[73] Assignee: Sharp Kabushiki Kaisha, Osaka, Japan

[21] Appl. No.: 753,908

[22] Filed: Jul. 11, 1985

[30] Foreign Application Priority Data

Jul. 18, 1984 [JP] Japan ................................ 59-150939

[51] Int. Cl.⁴ ............................................ G03G 15/00
[52] U.S. Cl. ..................................... 355/8; 355/3 SH; 355/50; 271/275; 271/267
[58] Field of Search .................... 355/8, 3 SH, 50, 51, 355/75, 76; 271/84, 198, 267, 275

[56] References Cited

U.S. PATENT DOCUMENTS 4,068,949 1/1978 Booth et al. ......................... 355/75
4,368,977 1/1983 Arter et al. ........................... 355/75

FOREIGN PATENT DOCUMENTS 50-3653 2/1975 Japan .

Primary Examiner—Arthur T. Grimley
Assistant Examiner—J. Pendegrass
Attorney, Agent, or Firm—Birch, Stewart, Kolasch & Birch

[57] ABSTRACT

A draft-transfer format for an electronic photocopying machine that reciprocates a draft-setter holding a draft sheet at a designated position and projects a picture of the draft document onto a photosensitive member. A conveying mechanism is installed above the draft-setter which conveys the inserted draft sheet to the predetermined position on the draft-setter. A drive force transmission mechanism is provided for transmitting a drive force to the conveying mechanism. A first drive mechanism is provided inside the photocopying machine which transmits the drive force to the drive force transmission mechanism during copying and a second drive mechanism is provided for transmitting the drive force to the drive force transmission mechanism during the return movement of the draft-setter after completing the draft-scanning operation.

3 Claims, 2 Drawing Figures

DOCUMENT-CONVEYING COPYING MACHINE

BACKGROUND OF THE INVENTION

The present invention relates to a document or draft-conveying copying machine which is provided with a device that automatically delivers draft sheets to be draft-setter and is capable of executing optical scanning operations. Conventional electronic photocopying machines generate electrostatic latent images on the surface of a photoconductive member which correspond to the draft picture by causing the draft picture to be exposed to the photoconductive member which is normally a uniformly charged recording medium. The electrostatic latent image is then developed by means of a developing agent containing toner prepared with a pigment. A stable toner image is then formed. The developed toner image is then transferred onto the copy paper.

After receiving the developed toner image, the developed paper is then separated from the sensitized member, and finally discharged from the copying machine through a toner fixation unit.

To correctly expose the draft picture to the uniformly charged photosensitive member, the draft picture is illuminated on the draft-setter. Reflected light contacts the charged photosensitive unit through optical means comprised of a mirror and lens. The photosensitive member is usually drum-shaped and rotates so that it can handle all copying processes. To correctly expose the draft picture on the draft-setter to the rotating photosensitive member, the draft must be optically scanned. Actually, there are two kinds of draft-scanning formats, the draft-transfer system that causes the draft-setter to move in synch with the rotation of the photosensitive member, and the optical-unit transfer system that causes part of the optical means to move along the draft-setter which remains stationary. Since the draft-transfer system causes the draft-setter to reciprocate and the optical path remains substantially constant, a compact simply designed copying machine can be built. The optical-unit transfer system is capable of tightly pressing voluminous drafts, such as a book, against the draft-setter owing to the stationary position of the draft-setter. In addition, since the draft-setter is stationary, a device capable of automatically feeding draft sheets onto the draft-setter can be easily installed. The automatic draft-feeding device is comprised basically of a means for feeding draft sheets from a draft tray, a means for transporting the designated draft sheets to a predetermined position on the upper surface of the draft-setter, and a means for removing the draft sheets onto a paper discharge tray after completing the draft scanning operation. However, if a draft-feeding device with the above configuration was installed on the draft-setter of a draft-transfer system copying machine, both the draft-setter and the draft-feeding device would have to be reciprocated together, thus making it difficult for the copying machine to stably perform the draft scanning operation. In addition, since a draft-feeding copying machine is provided with a motor for the draft conveying device, it is necessary to install a power supply line for the motor and a variety of signal transmission lines for correctly controlling the drive system. Actually, since installing these lines is a complex process, no conventional draft-feeding copying machine has yet been provided with an automatic draft-conveying device.

SUMMARY OF THE INVENTION

The present invention provides a simply designed draft-conveying device. More particularly, the present invention provides a draft-transfer format for an electronic photocopying machine incorporating an automatic draft-conveying device.

Other objects and further applications of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description. Typically, the preferred embodiments of the present invention provide a draft-transfer format electronic photocopying machine that reciprocates the draft-setter holding the draft sheet at the designated position and projects the uniformly image of the draft picture onto the charged surface of the photosensitive member wherein the photocopying machine is comprised of a; conveying means installed above the draft-setter which conveys the inserted draft sheet to a predetermined position of the draft-setter, a drive force transmission means which transmits a drive force to the conveying means. A first drive means provided in the copying machine, which transmits the drive force to the drive force transmission means and a second drive means which transmits a drive force to the drive force transmission means during the final return movement of the draft-setter after completing the draft-scanning operation.

BRIEF DESCRIPTION OF THE DRAWINGS

The present invention will be better understood from the detailed description given hereinbelow and the accompanying drawings which are given by way of illustration only, and thus are not limitative of the present invention in which.

DETAILED DESCRIPTION OF THE INVENTION

Referring now to the accompanying drawings, the preferred embodiments of the present invention are described below.

Figure 1:
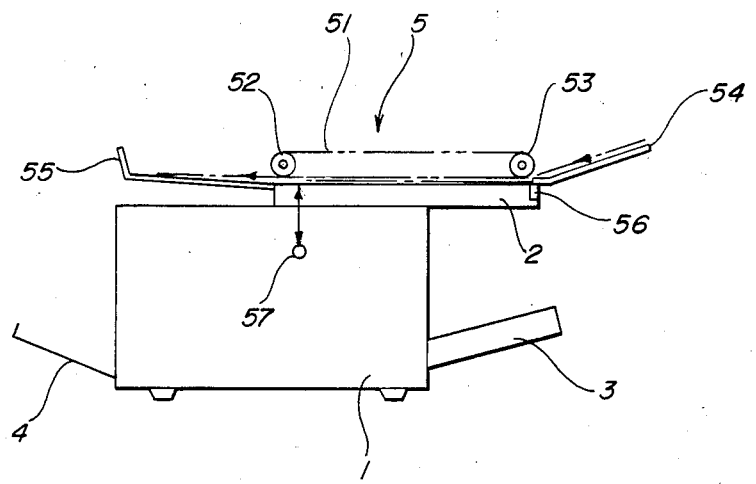
FIG. 1 is a side view of the electronic photocopying machine provided with the draft-conveying device embodied by the present invention.

FIG. 1 is a side view of the electronic photocopying machine reflecting the present invention. The photocopying machine 1 includes the draft-setter 2 provided with a transparent plate for setting draft sheets thereon, which is provided above the photocopying machine and capable of performing a reciprocating movement. A copy-paper cassette 3 stores a number of copying papers, which can be freely loaded into and unloaded from the photocopying machine 1. A tray 4 receives the copied papers discharged from the photocopying machine. A photosensitive member in a drum-shape is provided inside of a photocopying machine 1, while the charging device, exposure device, developer unit, photo-transfer unit, cleaning device, and adjacent electrical devices are provided about the periphery of the photosensitive drum. The exposure device projects light reflected from the draft paper on the draft-setter 2 onto the charged surface of the photosensitive member through an optical unit comprised of a lens. Copy papers stored in the cassette 3 are delivered in accordance with the paper-supply signals. The copy papers are then transported along a transport path that passes through the photo-transfer device before eventually being stored in the discharge-paper tray 4. A image fixing device is provided in the paper transport path so that the transferred picture image in the form of toner can be fixed on the copy paper. A draft-conveying device 5 reflecting the preferred embodiments of the present invention is provided above the draft-setter 2 that reciprocates itself. A conveyor belt 51 is set between the drive roller 52 and the inverting roller 53 so that the belt 51 can remain in contact with the transparent plate holding the draft sheet. A draft feed tray 54 allows the operator to manually insert the draft sheet beneath the conveyor belt 51. A draft receiver tray 55 receives the scan-completed draft sheet. Both of the trays 54 and 55 are integrally connected to the draft-setter 2. The draft conveying device 5 is not provided with its own driving source. The manually inserted draft sheet is conveyed forward and discharged by the movement of the conveyor belt 51 which is driven via the drive roller 52 by both a driving source inside the photocopying machine 1 and the moving force of the draft-setter 2. For example, when the draft sheet manually inserted from the draft feeder 54 is detected by the detect switch 56, the driving force generated inside the photocopying machine 1 is first transmitted to the belt drive roller 52, thus the conveyor belt 51 is activated so that the inserted draft sheet can be conveyed onto the draft-setter 2. When the draft sheet reaches a predetermined position on the draft-setter 2 and the sensor means 57 detects it, the driving force from the photocopying machine is deactivated, causing the conveyor belt 51 to stop at the position detected by the sensor means 57. The sensor means 57 provided inside the photocopying machine 1, is comprised of a light-emitting element which illuminates the draft-setter 2 and a light-receiving element which receives light reflected from the draft-setter 2. When the draft sheet reaches the predetermined position of the draft-setter 2, the sensor means 57 receives light reflected from the draft sheet so that the position of the draft sheet can be detected precisely. As soon as the draft sheet stops at the designated position detected by the sensor means 57, the photocopying operation is initiated. The draft-setter 2 then starts to move its position in synch with the rotation of the photosensitive drum on receipt of the drive force from the draft-setter driver of the photocopying machine so that the draft-setter 2 can reciprocate its movement. As a result, the draft picture is sequentially projected onto the photosensitive drum, thus generating an electrostatic latent image on the drum surface.

Figure 2:
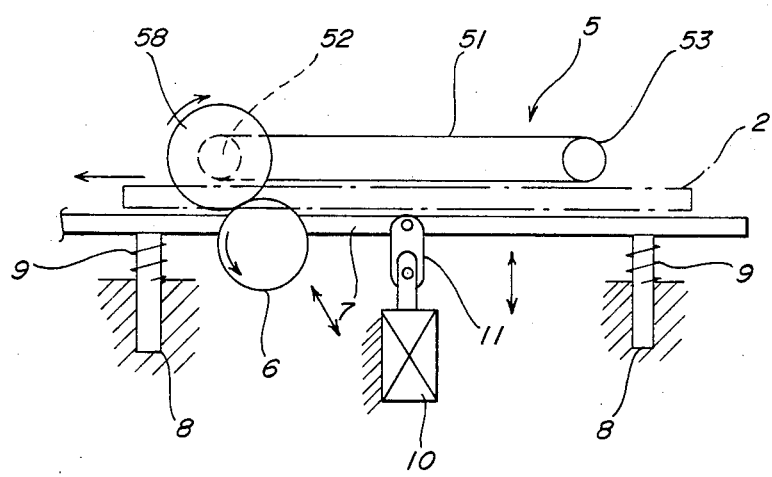
FIG. 2 is an enlarged view of the main part of one of the drive-system configurations of the draft-conveying device embodied by the present invention.

As soon as the draft-setter 2 has completed its forward movement, it starts to move backward until it returns to its initial position shown in FIG. 1. During this period, the belt-drive roller 52 is rotated by applying the force generated by the backward movement of the draft-setter 2 so that the draft sheet set at the designated position can be discharged onto the paper tray 55. FIG. 2 shows one example of realizing the drive mechanism described above. As shown in FIG. 2, the shaft of the drive roller 52 of the conveying belt 51 is connected to the shaft of the drive-force transmission roller 58 via connector means, such as gears. When the drive-force transmission roller 58 rotates, the drive roller 52 is rotated to drive the belt 51. The drive force transmission roller 58 is provided on the side of the draft-setter 2 on which the draft document is placed, more particularly, on the draft-conveyor device side of the draft-setter 2. When the draft-setter 2 is at the home position shown in FIG. 1, the drive force transmission roller 58 is pressed against a drive roller 6 of the photocopying machine 1. The drive roller 6 is rotated simultaneously with the detection of the inserted draft performed by the sensor switch 56 and stops its rotation the moment the sensor means 57 detects that the draft sheet is at the designated position. Independent of the drive roller 6, a pressure bar 7 transmits the drive force by being pressed in the direction of the movement of the draft-setter 2 against the drive force transmission roller 58. The pressure bar 7 is installed on the guides 8 that vertically move along guide holes so that the guides 8 vertically move inside the photocopying machine 1. The guides 8 are provided with springs 9 that causes the pressure bar 7 to move upward. The pressure bar 7 is provided with a solenoid 10 via the connector rod 11 which allows the pressure bar 7 to descend while resisting the force of the springs 9. Thus, while the solenoid 10 is activated by current flowing through it, the pressure bar 7 is pulled downward without being pressed against the drive force transmission roller 58. Conversely, when no current flows through the solenoid 10, the spring 9 caused the pressure bar 7 to be pressed against the drive force transmission roller 58. Current normally flows through the solenoid 10 except when copying is underway and until the draft-setter 2 returns to its home position after completing the designated reciprocating movements needed to copy the preset number of papers. In other words, while no current flows through the solenoid 10 and the draft-setter 2 is still on the way to its home position, the pressure bar 7 is pressed against the drive force transmission roller 58 to rotate this roller, thus causing the drive force to be transmitted to the belt driver roller 52 and the conveyer belt 51 so that these can move in the direction to discharge the draft sheet. This causes the draft sheet to be discharged from the draft setter 2 into the discharge-paper tray 55. The amount of the draft-setter 2 moves is predetermined. Therefore, it is desirable to adequately arrange the conveyor amount of the conveyer belt 51 so that it always exceeds the amount of the movement of the draft-setter 2. This can be realized by providing a connector means such as gears between the drive force transmission roller 58 and the belt driver roller 52 with an adequate gear ratio, for example "1" for the gear on the part of the drive force transmission roller 58 and less than "1" for the gear on the part of the belt drive roller 52.

The sequential operations of the copying machine incorporating the above configuration are described below. First, if a draft sheet is inserted into the draft-conveying device of the copying machine through the draft-feeder 54, the presence of this draft sheet is then detected by a sensor switch 56, thus causing the drive roller 6 on the part of the copying machine 1 to rotate in the direction of the arrow. As a result, the drive force transmission roller 58 in contact with the drive roller 6 also starts to rotate. At this time, since the solenoid 10 is activated, the pressure bar 7 is pulled down and separated from the drive force transmission roller 58. Accordingly, the drive force transmission roller 58 rotates in response to the rotation of the drive roller 6. The conveyer belt 51 is then driven by the belt drive roller 52. As a result, the inserted draft sheet is sandwiched between the conveyer belt 51 and the transparent plate of the draft-setter 2 which is then conveyed by the conveyor belt 51 over the surface of the transparent plate of the draft-setter 2. The sensor means 57 detects the arrival of the conveyed draft sheet at the predetermined position of the draft-setter 2. In response to the detect signal from the sensor 57, the drive roller 6 then stops its rotation so that the draft sheet can correctly stop at the predetermined position of the draft-setter 2. In this condition the, photocopying operation is activated by either pressing the "COPY START" button or by receipt of the detect signal generated when the draft sheet is exactly at the predetermined position of the draft-setter 2. The drive force from the copying machine 1 is then transmitted to the draft-setter 2, thus activating the draft-setter 2 so that it can move forward to optically scan the draft picture in synch with the rotation of the photosensitive member. During this period, since the solenoid 10 has already been activated by current flowing through it, the pressure bar 7 remains apart from the drive force transmission roller 58. As a result, even when the draft-setter 2 moves forward, the drive force transmission roller 58 doesn't rotate, thus allowing the draft-setter 2 to move forward with the draft sheet to the predetermined position.

As the draft-setter 2 now moves forward, the draft picture is sequentially projected onto the photosensitive member. As a result, an electrostatic latent image is formed on the surface of the photosensitive member. The electrostatic latent image is then developed to form a toner image by means of a developing device. The visible toner image is then transferred onto the the copy with paper supplied from the cassette 3. The copy with the transferred toner image then passes through the toner fixation device on the way to the discharge paper tray 4 through the paper conveyance path. In this way, the toner image is fixed onto the surface of the copy paper. After completing the transfer of the toner image onto the copy papers, residual toner is removed from the surface of the photosensitive member by the cleaning device while a residual charge is also removed by the discharger. Finally, the photosensitive member stands by for the next toner image formation.

On the other hand, as soon as the forward movement, i.e., the draft scanning operation, is completed, the draft-setter 2 stops its forward movement and begins reverse movement.

When multiple copying operations are underway, the draft-setter 2 repeats the above mentioned operations until the designated number of papers are processed even after returning to its home position. When the final draft scanning operation is completed, the draft-setter 2 then reverses its movement to return to its home position.

After completing the final draft-scanning operation, the draft-setter 2 then begins reverse movement and current is cut off from the solenoid 10. As a result, the springs 9 press the pressure bar 7 against the drive force transmission roller 58. This prompts the draft-setter 2 to move backward, causing the drive force transmission roller 58 to rotate clockwise, as shown in FIG. 2. When the drive force transmission roller 58 rotates clockwise, the conveyor belt 51 is then driven by the belt-drive roller 52. The draft sheet held at the designated position is then carried forward to be discharged onto the tray 55. Then, the draft-setter 2 starts to move backward until it returns to its home position. As soon as the draft-setter 2 has returned to its home position, backward movement stops and current again flows through the solenoid 10, thus causing the pressure bar 7 to leave the drive force transmission roller 58.

The preferred embodiment has referred to an example in which connector means, such as gears, are made available. They are set at an adequate gear ratio between the drive force transmission roller 58 and the belt-drive roller 52, sufficient to deliver a full-length draft sheet from the draft-setter 2 before it returns to its home position. However, another embodiment of the present invention allows the draft sheet to be easily and effectively discharged from the draft-setter 2 by rotating the belt-drive roller 6 for a specific period of time as the draft-setter 2 returns to its home position. To realize this, both the drive force transmission roller 58 and the belt-drive roller 52 may be aligned on one shaft without the gears typically used in the above preferred embodiment.

In conjunction with the draft-transfer format electronic photocopying machine reflecting the present invention, the draft-conveying device installed on the reciprocating draft-setter effectively drives the draft-conveying means by applying the drive force transmitted from the copying machine despite the absence of its own drive force and allows the draft-conveying means to operate in conjunction with the return movement of the draft-setter. As a result, the preferred embodiments realize a simplified configuration of the draft-conveying device while minimizing the load applied when transferring the position of the draft-setter mounted on the draft-conveying device. Furthermore, since the draft-conveying device itself is not provided with its own drive source, it dispenses with the power line and signal transmission line otherwise needed to control the movement of the draft-conveying device, thus totally freeing the system from any kind of wiring problems. Thus, the present invention easily realizes the useful draft-conveying device for the draft-transfer format electronic photocopying machines.

While only certain embodiments of the present invention have been described, it will be apparent to those skilled in the art that various changes and modifications may be made therein without departing from the spirit and scope of the present invention as claimed hereinbelow.

What is claimed is:

1. A document transfer system for an electronic photocopying machine incorporating a reciprocating draft-conveying device that reciprocates with a draft-setter supporting a draft sheet at a designated position and which photocopying machine projects a picture of the draft document onto a photosensitive member during draft-scanning and copying comprising:

a conveying means positioned above said draft-setter for conveying said inserted draft sheet to a predetermined position on said draft-setter;

a drive force transmission means for transmitting a drive force to said conveying means;

a first drive means provided in said photocopying machine for transmitting said drive force to said drive force transmission means during positioning of said draft sheet on said draft-setter; and a second drive means for transmitting said drive force to said drive force transmission means during return movement of said draft-setter following completion of said draft-scanning and copying operation.

2. The document-transfer system of claim 1, including:
- a first sensor switch for detecting the presence of said draft sheet to be introduced onto said draft-setter; and
- a second sensor switch for detecting when said draft sheet has reached said predetermined position on said draft-setter;
- said first drive means driving said drive force transmission means during the period wherein said draft sheet is positioned on said draft-setter.

3. The document transfer system of claim 1, wherein said second drive means comprises a solenoid controlled spring biased bar.

* * * * *